US012724980B2

(12) United States Patent
Hattangady et al.

(10) Patent No.: US 12,724,980 B2
(45) Date of Patent: Sep. 1, 2026

(54) CONTEXT-ENHANCED ADVANCED FEEDBACK FOR DRAFT MESSAGES

(71) Applicant: Microsoft Technology Licensing, LLC, Redmond, WA (US)

(72) Inventors: Poonam Ganesh Hattangady, Seattle, WA (US); Michael Ivan Borysenko, Brighton (CA); Alexander Ian Pfister Trzyna, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 18/342,386

(22) Filed: Jun. 27, 2023

(65) Prior Publication Data

US 2025/0005295 A1 Jan. 2, 2025

(51) Int. Cl.

| | |
|---|---|
| ***G06F 40/40*** | (2020.01) |
| ***G06F 3/0482*** | (2013.01) |
| ***G06F 3/0484*** | (2022.01) |
| ***G06F 40/103*** | (2020.01) |
| ***G06F 40/166*** | (2020.01) |
| ***G06F 40/30*** | (2020.01) |

(52) U.S. Cl.

CPC ............ *G06F 40/40* (2020.01); *G06F 40/103* (2020.01); *G06F 40/166* (2020.01); *G06F 40/30* (2020.01); *G06F 3/0482* (2013.01); *G06F 3/0484* (2013.01)

(58) Field of Classification Search

CPC ...... G06F 40/40; G06F 40/103; G06F 40/166; G06F 40/30; G06F 3/0482; G06F 3/0484; G06F 3/04895; H04L 51/02

See application file for complete search history.

(56) References Cited

U.S. PATENT DOCUMENTS

| | | | | |
|---|---|---|---|---|
| 10,574,600 | B1 * | 2/2020 | Chiarella | H04L 51/214 |
| 10,803,250 | B2 * | 10/2020 | Chui | G06F 40/30 |
| 2007/0060177 | A1 * | 3/2007 | Major | H04L 51/066 455/466 |
| 2010/0070880 | A1 * | 3/2010 | Chinta | G06Q 10/107 715/752 |
| 2019/0132393 | A1 * | 5/2019 | Ring | G06F 9/44521 |
| 2021/0165973 | A1 * | 6/2021 | Kofman | G06F 40/30 |
| 2021/0303775 | A1 * | 9/2021 | Deleuze | G06F 40/166 |
| 2024/0346441 | A1 * | 10/2024 | McColeman | G06N 5/04 |
| 2024/0354501 | A1 * | 10/2024 | Bouguerra | G06F 40/205 |

* cited by examiner

*Primary Examiner* — Athar N Pasha

(57) ABSTRACT

Systems and methods for generating advanced feedback for draft messages using a language model are disclosed. Prior messages, along with corresponding reactions, may be incorporated into an AI prompt that is processed by a language model to generate an output payload. The output payload is processed to generate custom profiles for users that have provided the reactions to the messages. At runtime, while a draft message is being composed within a messaging application, the data from the draft message (and message thread where applicable) are received. The custom profiles for recipients of the draft message are then retrieved from the database of custom profiles. The data from the draft message as well as the retrieved custom profiles are incorporated into another AI prompt that is processed by the language model to produce another output payload. The output payload is post-processed to extract advanced feedback for the draft message.

19 Claims, 12 Drawing Sheets

CONTEXT-ENHANCED ADVANCED FEEDBACK FOR DRAFT MESSAGES

BACKGROUND

Productivity applications are designed to help entities (e.g., individuals and organizations) generate content and data (e.g., electronic communications, schedules, documents, projects) more efficiently. Some productivity applications are used to receive, compose, and respond to electronic communications, such as emails, text messages, chat messages, etc., (generally, messages). Generating new messages and drafting new messages proves to be challenging and often requires additional rewriting and edits that reduce the overall functionality and efficiency of the messaging applications and their intended uses.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for generating advanced feedback for draft messages using a language model. For example, prior messages that have been received and/or sent by a user may be analyzed. In particular, the prior messages, along with corresponding reactions to those messages, may be incorporated into an AI prompt that is processed by a language model to generate an output payload. The output payload is processed to generate custom profiles for users that have provided the reactions to the messages. The custom profiles may be stored in a cloud or shared database that is accessible to multiple messaging applications. The generation of the custom profiles may be done in an offline manner to conserve resources at peak processing times and to create or update the custom profiles prior to their use in generating the advanced feedback discussed herein.

At runtime, while a draft message is being composed within a messaging application, the data from the draft message (and message thread where applicable) are received. The custom profiles for recipients of the draft message are then retrieved from the database of custom profiles. The data from the draft message as well as the retrieved custom profiles are incorporated into another AI prompt that is processed by the language model to produce another output payload. The output payload is post-processed to extract feedback for the draft message. The extracted feedback may then be displayed within the messaging application, such as in a feedback subpanel positioned between a body field and subject field of the messaging application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for generating advanced feedback through the use of a language model, such as a large language model (LLM), mutlimodal model, or other type of generative AI model. In an example implementation, an electronic-communications productivity application is used to help a user to generate real-time feedback on a message being drafted, such as an email, text message, chat message, or the like. Such electronic communications are hereinafter referred to generally as messages and the electronic communications productivity application is hereinafter referred to generally as a messaging application. According to an example, a message generator is provided that generates complex feedback based on prior messages and additional context of the message being drafted, such as the recipients and sender of the message.

Figure 1:
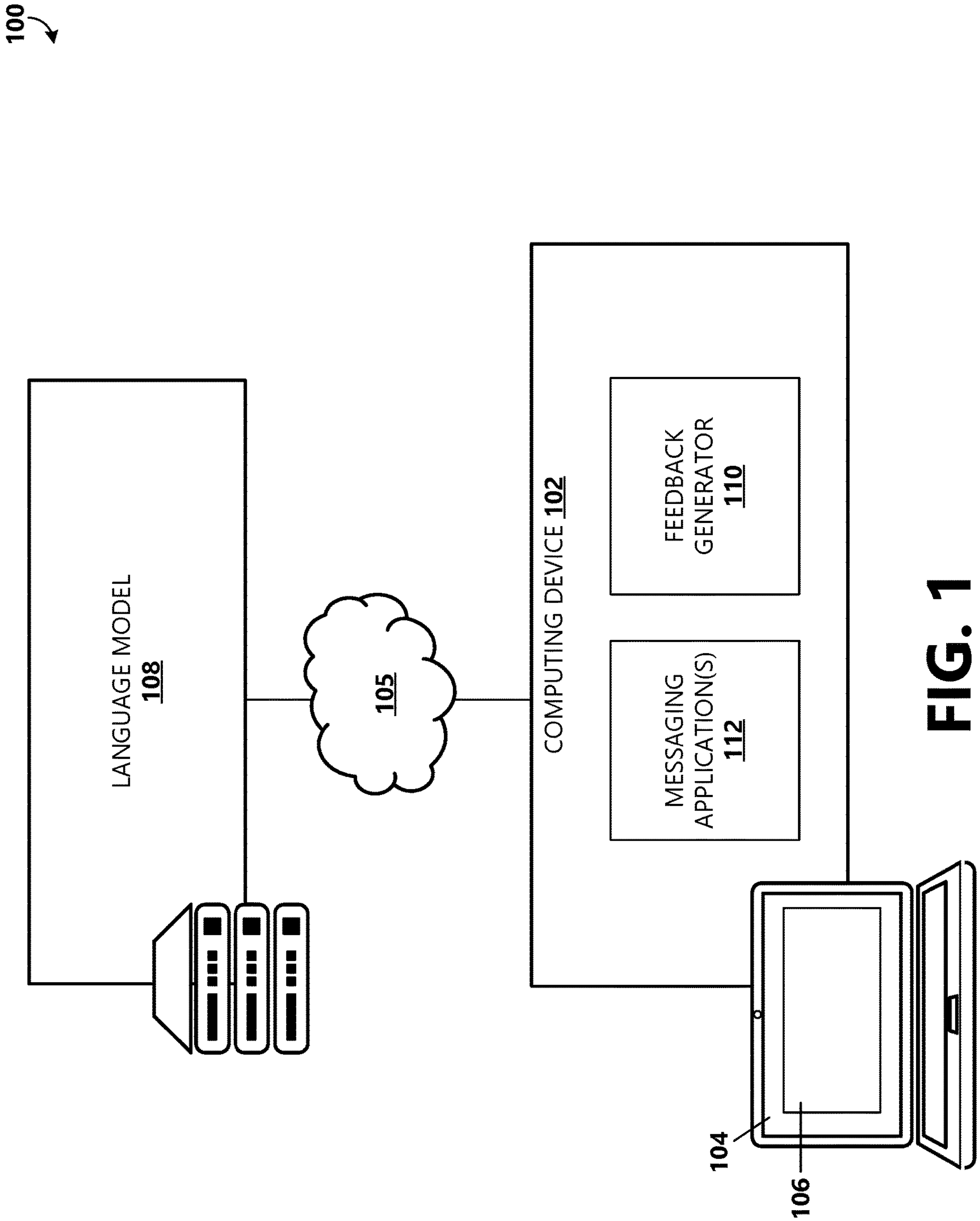
FIG. 1 is a block diagram of a system in which an advanced message feedback system is implemented according to an example.
Figure 7:
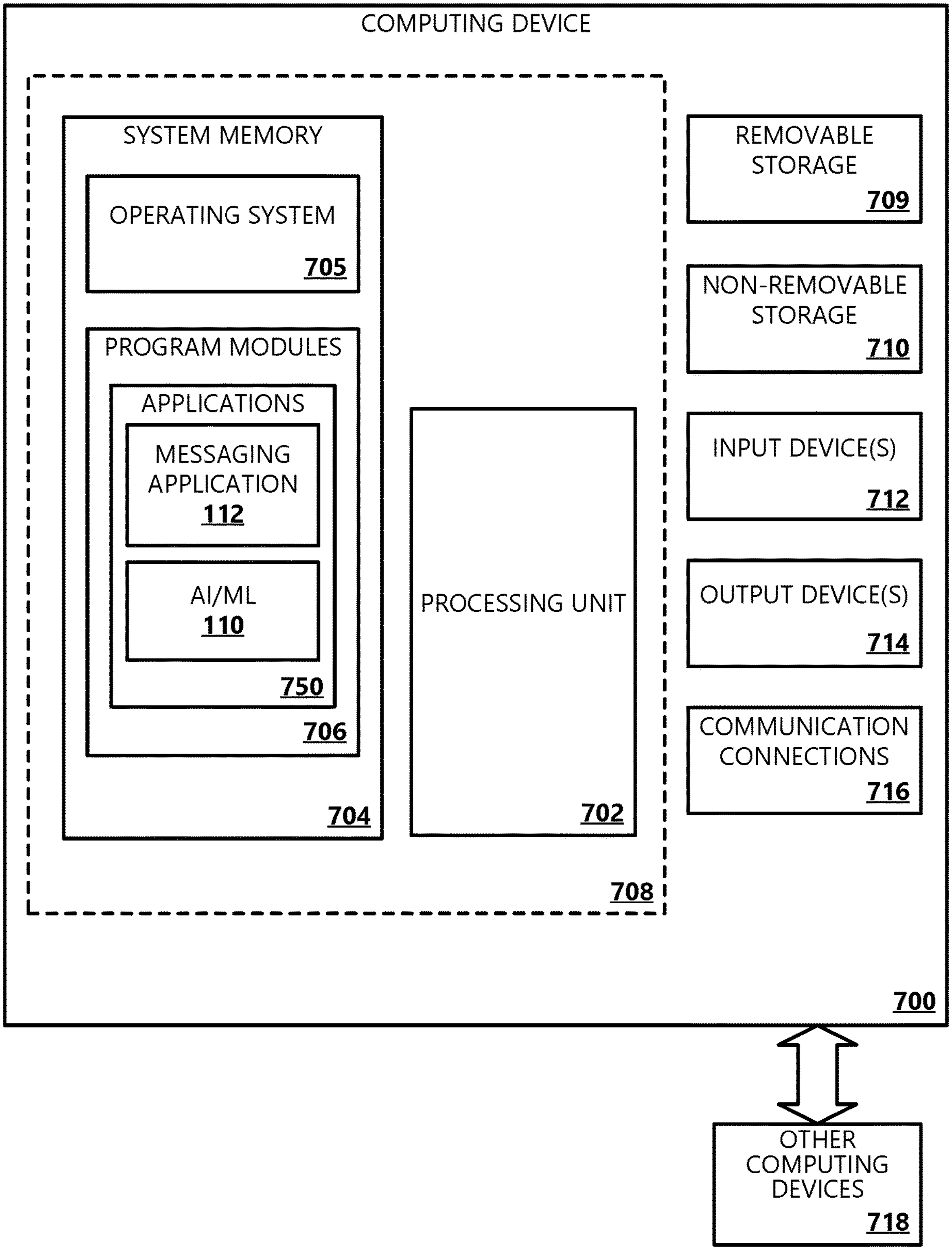
FIG. 7 is a block diagram illustrating example physical components of a computing device with which aspects of the disclosure may be practiced.

FIG. 1 is a block diagram of an example system 100 for providing advanced feedback in accordance with an example. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 7. In another example, the components of systems disclosed herein are distributed across multiple processing devices. For instance, input may be entered on a user device or client device and information may be processed on or accessed from other devices in a network, such as one or more remote cloud devices or web server devices.

The example system 100 generates advanced feedback using a language model 108, which may be an LLM, a multimodal model, or other types of generative AI models. Example models may include the GPT models from OpenAI, BARD from Google, and/or LLAMA from Meta, among other types of generative AI models. According to an aspect, the system 100 includes a computing device 102 that may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

In examples, the computing device 102 includes a plurality of productivity applications (collectively, productivity applications) for performing different tasks, such as communicating, information generation and/or management, data manipulation, visual construction, resource coordination, calculations, etc. According to an example implementation, the productivity applications include at least one messaging application 112 that operates to allow users to send and receive messages. Messages can be in various formats, such as text, audio, images, and/or video. Example messaging applications 112 include, but are not limited to, an email application, a messaging application, a chat application, a voicemail application, enterprise software, an information worker application, and the like. The messaging application(s) 112 may be local applications or web-based applications accessed via a web browser. Each messaging application 112 has one or more application UIs 106 by which a user can view and generate messages and interact with features provided by the messaging application 112. For example, an application UI 106 may be presented on the display screen 104. In some examples, the operating environment is a multi-application environment by which a user may view and interact with multiple messaging applications 112 through multiple application UIs 106.

According to examples, the system 100 further includes a feedback generator 110 that generates the advanced feedback for a draft message, as discussed herein. In some examples, the draft message is a new message (e.g., a first communication in a conversation thread). In other examples, the draft message is a reply message (e.g., a subsequent communication to the first communication in a conversation thread). In some implementations, the feedback generator 110 is included in one or more messaging applications 112. According to an example, the feedback generator 110 is a separate module that is communicatively integrated into one or more messaging applications 112 via an application programming interface (API). As will be described in further detail below, the feedback generator 110 provides functionality for generating content for a suggested message.

In an example implementation, the feedback generator 110 combines at least a portion of a message that is being drafted and custom profile information, that has been generated for the recipient(s) of the message, into an AI prompt for the language model 108. The language model 108 then generates an output payload based on the prompt. The output payload is parsed and otherwise processed to generated and display the advanced feedback discussed herein These and other examples are described below in further detail with reference to FIGS. 2-7.

According to example implementations, the language model 108 is trained to understand and generate sequences of tokens, which may be in the form of natural language (e.g., human-like text). In various examples, the language model 108 can understand complex intent, cause and effect, perform language translation, semantic search classification, complex classification, text sentiment, summarization, summarization for an audience, and/or other natural language capabilities.

In some examples, the language model 108 is in the form of a deep neural network that utilizes a transformer architecture to process the text it receives as an input or query. The neural network may include an input layer, multiple hidden layers, and an output layer. The hidden layers typically include attention mechanisms that allow the language model 108 to focus on specific parts of the input text, and to generate context-aware outputs. Language model 108 is generally trained using supervised learning based on large amounts of annotated text data and learns to predict the next word or the label of a given text sequence.

The size of a language model 108 may be measured by the number of parameters it has. For instance, as one example of an LLM, the GPT-4 model from OpenAI has billions of parameters. These parameters may be weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The language model 108 in examples herein, however, is pre-trained, meaning that the language model 108 has already been trained on the large amount of data. This pre-training allows the model to have a strong understanding of the structure and meaning of text, which makes it more effective for the specific tasks discussed herein.

The language model 108 may operate as a transformer-type neural network. Such an architecture may employ an encoder-decoder structure and self-attenuation mechanisms to process the input data (e.g., the prompt). Initial processing of the prompt may include tokenizing the prompt into tokens that may then be mapped to a unique integer or mathematical representation. The integers or mathematical representations combined into vectors that may have a fixed size. These vectors may also be known as embeddings.

The initial layer of the transformer model receives the token embeddings. Each of the subsequent layers in the model may uses a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a softmax activation function. This outputs a probability distribution over all possible tokens in the model's vocabulary. The token(s) with the highest probability is selected as the output token(s) for the corresponding input token(s).

In example implementations, the language model 108 operates on a device located remotely from the computing device 102. For instance, the computing device 102 may communicate with the language model 108 using one or a combination of networks 105 (e.g., a private area network (PAN), a local area network (LAN), a wide area network (WAN)). In some examples, the language model 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figure 2A:
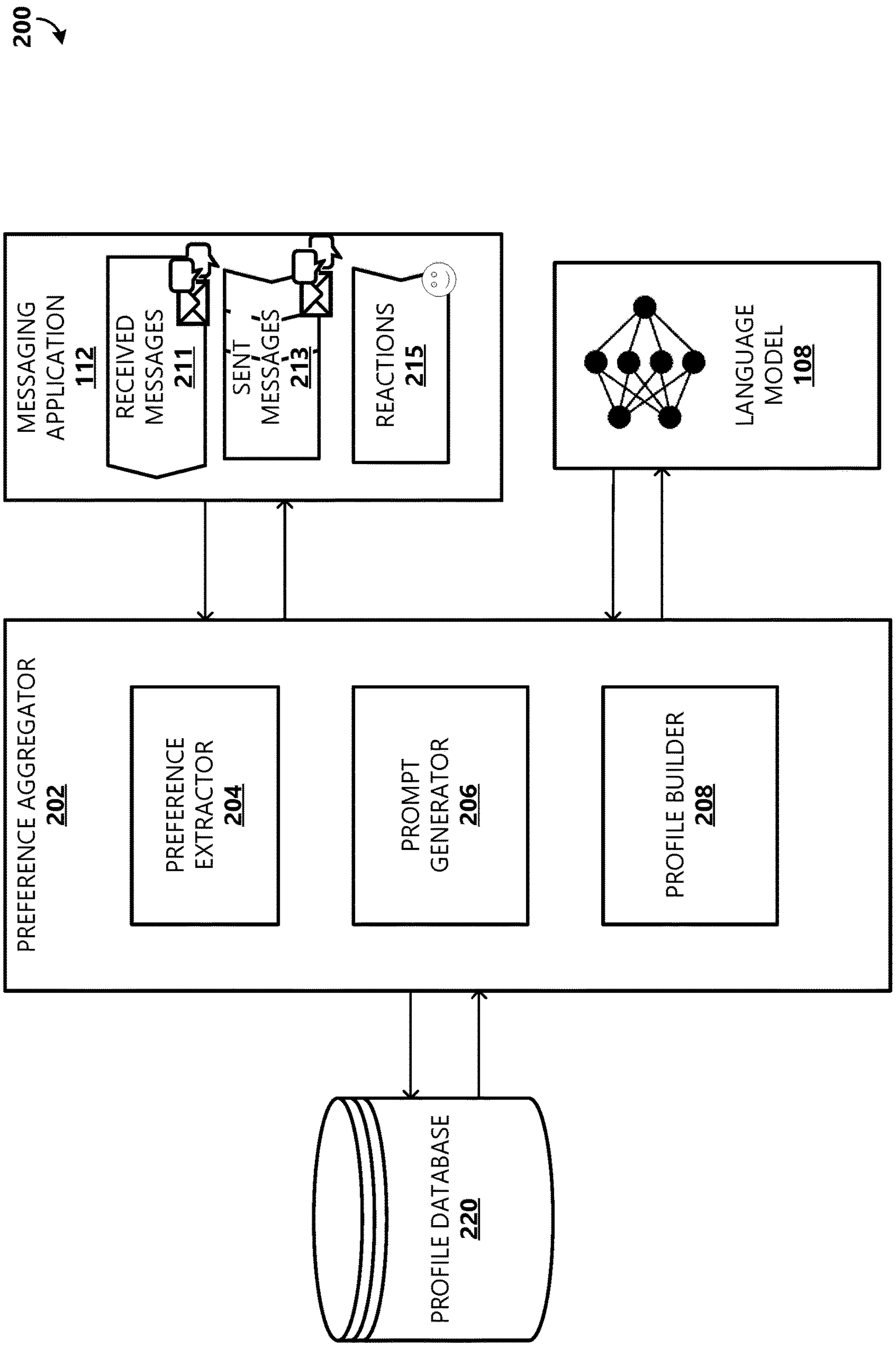
FIG. 2A is a block diagram of example components of an offline custom profile generation system.

FIG. 2A is a block diagram of example components of an offline custom profile generation system 200. System 200 includes a preference aggregator 202 that includes a preference extractor 204, a prompt generator 206, and a profile builder 208. The preference aggregator 202 is in communication with a profile database 220. The preference aggregator 202 is also in communication with the language model 108 and the messaging application 112. The messaging application 112 may include, or provide access to, received messages 211, sent messages 213, and reactions 215 to messages.

The preference aggregator 202 may be a part of (e.g., a component of) the messaging application 112. For instance, the preference aggregator 202 may form a portion of the software code that defines the messaging application 112. In other examples, the preference aggregator 202 may be part of a separate service or application, such as a cloud-based service.

In some examples, the preference aggregator 202 communicates with the messaging application 112 to receive messages from the messaging application 112. For instance, the preference aggregator 202 requests and receives received messages 211, sent messages 213, and/or reactions 215. The received message 211 are messages that are received by a particular user, and the sent messages 213 are messages that are sent from the particular user. In some examples, the received messages 211 and the sent messages 213 are part of the same message thread or chain.

The reactions 215 are reactions to one or more received messages 213. The reactions 215 may thus be tied to, or correlated with, the particular message for which the reaction was issued. The reactions 215 may also include reactions made by others to the sent messages 213 sent by the particular user. Example reactions 215 may include thumbs up, like, thumbs down, dislike, laugh, excited, etc. Each of the reactions may have an associated positive or negative connotation or sentiment.

The preference extractor 204 filters messages (e.g., the received messages 211 and/or the sent messages 213) that have reactions 215 with a particular connotation, such as a positive connotation or a negative connotation. For example, the preference extractor 204 extracts all the messages that have had a reaction that have received a positive reaction. This extraction may include extracting received messages 211 for which the particular user has sent a positive reaction. The positive reaction may be identified from an actual reaction-type communication and/or a sentiment analysis of a reply message sent in response to a received message. In some examples, the extracted messages include sent messages that have received positive reactions from the recipients, which may be identified from a reaction-type communication or from a sentiment analysis of the responsive email.

The message extraction may be performed on an aggregate set of messages or on a message-by-message basis. For example, for each message that a user replies to or reacts to, the message may be analyzed and extracted by the preference extractor 204 and the preference aggregator 202. The extraction and analysis performed by the preference aggregator 202 may also be performed offline or at times subsequent to the receipt of the messages such that the custom profiles discussed herein may be generated at times prior to the advanced feedback being provided.

The prompt generator 206 then forms an AI prompt for the language model 108. The AI prompt may include instructions, in the form of static portions, that request the language model 108 detect primary topics of the messages, styles of the messages, mood or tone of the messages, and/or the user's response to the messages. The dynamic portion of the prompt is populated with the data of the messages. In examples where the messages are sent messages 213 for which reactions have been received, the AI prompt may request similar information, but the information is correlated with the user(s) that sent the reactions rather than the user who sent the message.

The language model 108 processes the AI prompt from the prompt generator 206 and provides an output payload with the data requested in the AI prompt. For instance, the output payload may include primary topics of the messages, styles of the messages, mood or tone of the messages, and/or the user's response to the messages.

The profile builder 208 receives and processes output payloads from the language model 108 to build custom profiles for the particular user and/or users with whom the particular user communicates. For instance, for the particular user, the profile builder 208 generates a custom profile of the likes and dislikes of the user based on the output payloads from the language model 108. As an example, the custom profile for the user may include the primary topics for which the user provides a positive response or reaction. Alternatively or additionally, the custom profile for the user may include tones or styles of messages (e.g., formal, neutral, casual, short, medium, long) for which the user has a preference. The custom profiles may similarly be generated for other users with whom the particular user communicates based on the replies and reactions that are received from those users.

Once the custom profile is generated, the custom profile is stored in the profile database 220. The profile database 220 may store custom profiles for multiple users. The profile database 220 may be stored remotely from the preference aggregator 202 and/or the messaging application 112. Accordingly, the profile database 220 may be accessed via a network connection. Thus, storing the custom profiles generated by the profile builder 208 includes transmitting the custom profile, and/or data for updating or editing the custom profile, to the profile database 220. In other examples, the profile database 220 may be stored locally on the same device as the preference aggregator 202 and/or the messaging application 112.

In some examples, the custom profiles that are generated may be edited or augmented by the corresponding user. For instance, User A may be able to edit or augment the custom profile for User A. In some examples, User A may also be able to edit or augments the custom profile for User B where such permissions are granted. This editing and/or augmenting may allow for additional customization and personalization of the profiles to provide better advanced feedback as discussed below.

By having more accurate profiles generated from the profile generation processes discussed herein, better more reliable and/or more accurate feedback may be provided. With more accurate feedback, the likelihood of the feedback having to be regenerated is reduced, which ultimately reduces the computational resources required or utilized by the systems discussed herein.

Generation of the custom profiles may also be performed in an offline manner that allows for the profiles to be generated at off peak times to conserve processing power and bandwidth during peak times. Moreover, the shared database of custom profiles allows for access to the custom profiles from multiples devices and users. Such a shared database reduces the overall memory footprint required by the system as compared to having locally stored duplicate profiles for multiple different users.

Figure 2B:
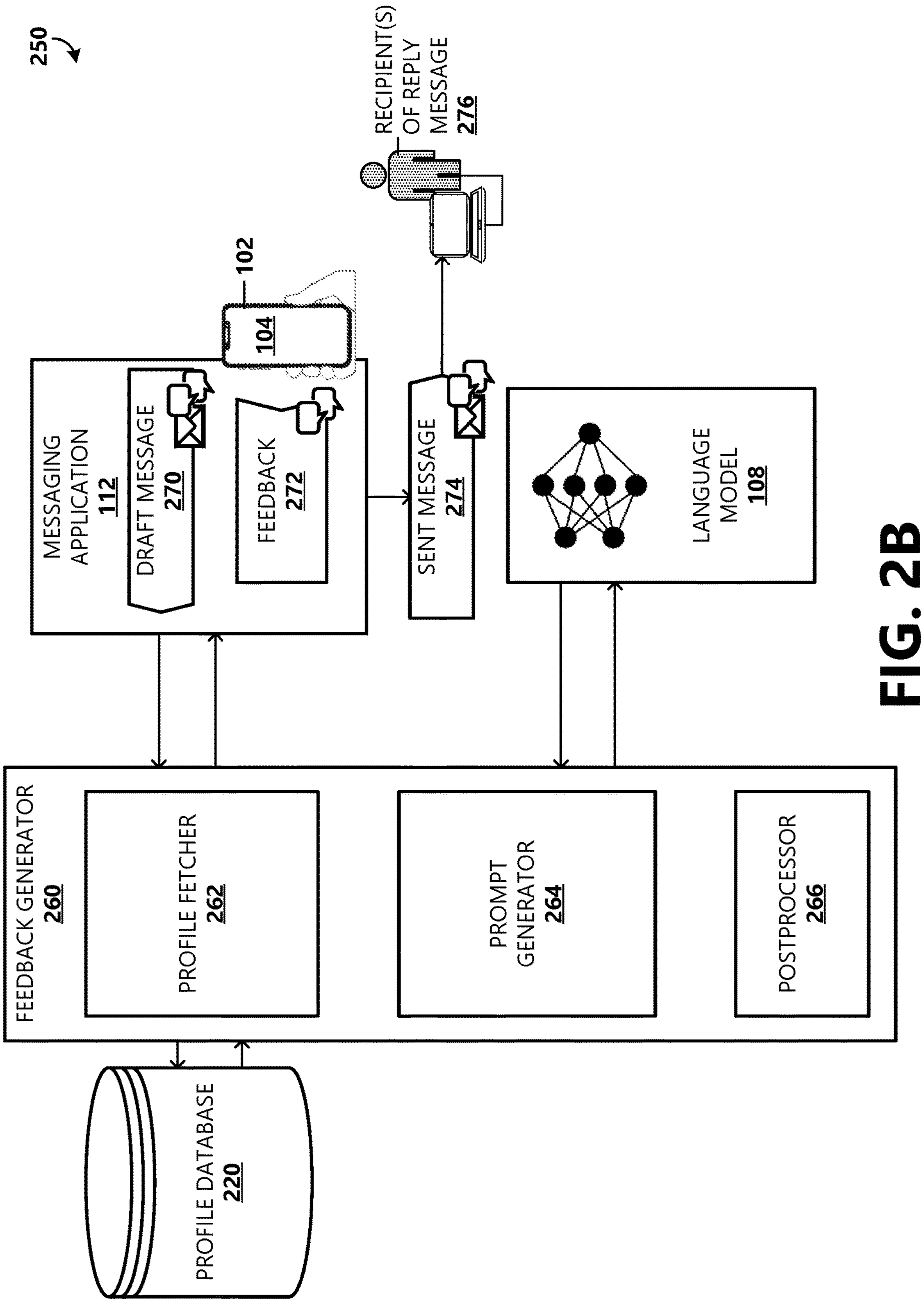
FIG. 2B is a block diagram of example components of an advanced message feedback system.

FIG. 2B is a block diagram of example components of an advanced message feedback system 250. The system 250 includes a feedback generator 260 that includes a profile fetcher 262, a prompt generator 264, and a postprocessor 266. The feedback generator 260 is in communication with the profile database 220 and the messaging application 112. The messaging application 112 includes, or provides access to, a draft message 270 that is currently being drafted by the user within a user interface of the messaging application. The messaging application 112 also causes the display of advanced feedback 272 generated by the feedback generator 260. The feedback generator 260 is also in communication with the language model 108.

The feedback generator 260 may be a part of (e.g., a component of) the messaging application 112. For instance, the feedback generator 260 may form a portion of the software code that defines the messaging application 112. In other examples, the feedback generator 260 may be part of a separate service or application, such as a cloud-based service.

More specifically, when a user is drafting a message, the advanced feedback features of the technology discussed herein are automatically triggered or triggered in response to the selection of a UI element or other trigger. When the advanced feedback features are triggered, the draft message 270 is communicated to the feedback generator 260.

The profile fetcher 262 then fetches the custom profiles for the recipients of the draft message 270. The custom profiles may be fetched by querying the profile database 220 for the custom profiles stored therein. The corresponding custom profiles for the recipients are then returned to the profile fetcher 262.

The prompt generator 264 then generates an AI prompt for the language model 108. The AI prompt includes the details of the draft message 270, such as the body of the message, the subject of the message, and the recipients of the message. In examples where the draft message 270 is part of a conversation thread (e.g., a reply or forward message), details of the conversation thread may also be included in the AI prompt.

The AI prompt further includes the custom profile data for the recipients of the draft message 270. In some examples where there a large number of recipients, the custom profile for the first set number of recipients are used instead of the custom profile information for all of the recipients. In other examples, the relative roles or titles of the recipients are determined, and the custom profiles for the highest-ranking roles (e.g., top 5 highest-ranked individuals) are included in the AI prompt. The relative roles may be accessed by the feedback generator 260 via a query of the organizational chart for the corporation of which the user is a part. Such an organizational chart may also be stored within the profile database 220 or other similar database to which the feedback generator 260 is in communication. By incorporating only the top custom profiles, the limited length of the AI prompt may be more efficiently used for additional data, such as data from the conversation thread.

An example AI prompt may be as follows:

```
<EMAIL_THREAD>
// the email being replied to goes here
</EMAIL_THREAD>
<REPLY>
// The user's currently composed draft reply that they are getting feedback on
</REPLY>
<CUSTOM PROFILES>
//Fetched profiles of recipients inserted here
</CUSTOM PROFILES>
[REQUEST INSTRUCTIONS] Based on the email above and the custom
profiles for the recipients, provide feedback to ensure the email sounds
professional and energizing to the team.
Feedback should always be kind, supportive and encouraging
For negative feedback, use passive voice. Use soft phrases like "you can
explain better" rather than "you do not explain" to the feedback doesn't come
across as harsh or accusatory
[OUTPUT FORMATTING INSTRUCTIONS] Use Markdown table format:
|Area | A short feedback in no more than 4 words | 1 standardized Unicode
emoji that best represents this feedback | A detailed explanation in no more
than 50 words | 2 examples of how to improve words or phrasing and why |
Write n/a in the column, if it's not applicable.
```

-continued

```
[TOPIC INSTRUCTIONS] Provide feedback on these topics:
Overall tone
Reader Sentiment
Lack of specificity and details
Clarity
```

The example AI prompt above includes both dynamic segments and static segments. The dynamic segments include the data that is populated from the current draft message and/or conversation details (e.g., <EMAIL_THREAD>, <REPLY>) and the custom profile(s). In contrast to the dynamic segments, the static segments may remain the same for each AI prompt that is generated. The static segments may include items such as the [REQUEST INSTRUCTIONS], [OUTPUT FORMATTING INSTRUCTIONS], and [TOPIC INSTRUCTIONS].

The request instructions provide instructions for what is requested of the language model 108. This can include the processes that are to be performed and how those processes are to be performed. In addition, preventative guardrails may also be included that prevent certain type of outputs (e.g., feedback) from being generated. The tone or style of the feedback may also be specified within the request instructions.

The output formatting instructions include instructions or details for how the output payload is to be formatted or structured. For instance, in the example above, the output formatting instructions include that the output payload should be in a markdown format with specific delimiters. By including such formatting instructions, a more predictable output is generated, and the output can be more consistently parsed. Unlike some AI models that have a set format for the output (e.g., a predefined array), generative AI models generally do not output such a consistent and/or structured data format. Such a conglomeration of unstructured data can be difficult to parse, and may lead to improper or nonsensical outputs. By specifying the format requirements of the output within the AI prompt itself, the overall consistency and performance of the advanced feedback systems are improved.

The topic instructions provide specific topics for which feedback should be generated. In some examples, the topics may be configurable by the user. Custom topics may also be set by the user via natural language. For instance, in a configuration setting of the advanced feedback system, the user may add any type of natural language topic for feedback to be generated.

The generated AI prompt from the prompt generator 264 is then provided as input to the language model 108. The language model 108 processes the AI prompt and generates an output payload in response to the AI prompt. The output payload is received by the feedback generator 260. The postprocessor 266 then processes the output payload to generate the advanced feedback 272. The post-processing operations may include parsing the output payload to extract defined segments of the output payload. The parsing may be possible (or at least improved) due to the formatting of the output payload that is caused by the output formatting instructions provided in the AI prompt. The post-processing may also include filtering or cleaning the output payload to ensure inappropriate content was not provided by the language model 108. The post-processing also includes further formatting of the data in the output payload into the user interface features of the feedback 272, as discussed further below. The postprocessed feedback data is then provided to the message application 112 where the advanced feedback 272 may be displayed and interacted with.

Once the advanced feedback 272 is displayed, the draft message may be edited according to the advanced feedback 272. Such editing of the draft message 270 may occur manually by the user interpreting the feedback. In other examples, the feedback may be automatically applied to edit the draft message 270. The edited message is then sent to the recipient(s) 276 of the message, where the draft message 270 then becomes a sent message 274. The sent message 274 and/or reactions or replies to the sent message may then be used to further update or augment the custom profiles using the offline custom profile generation system 200.

Figure 3A:
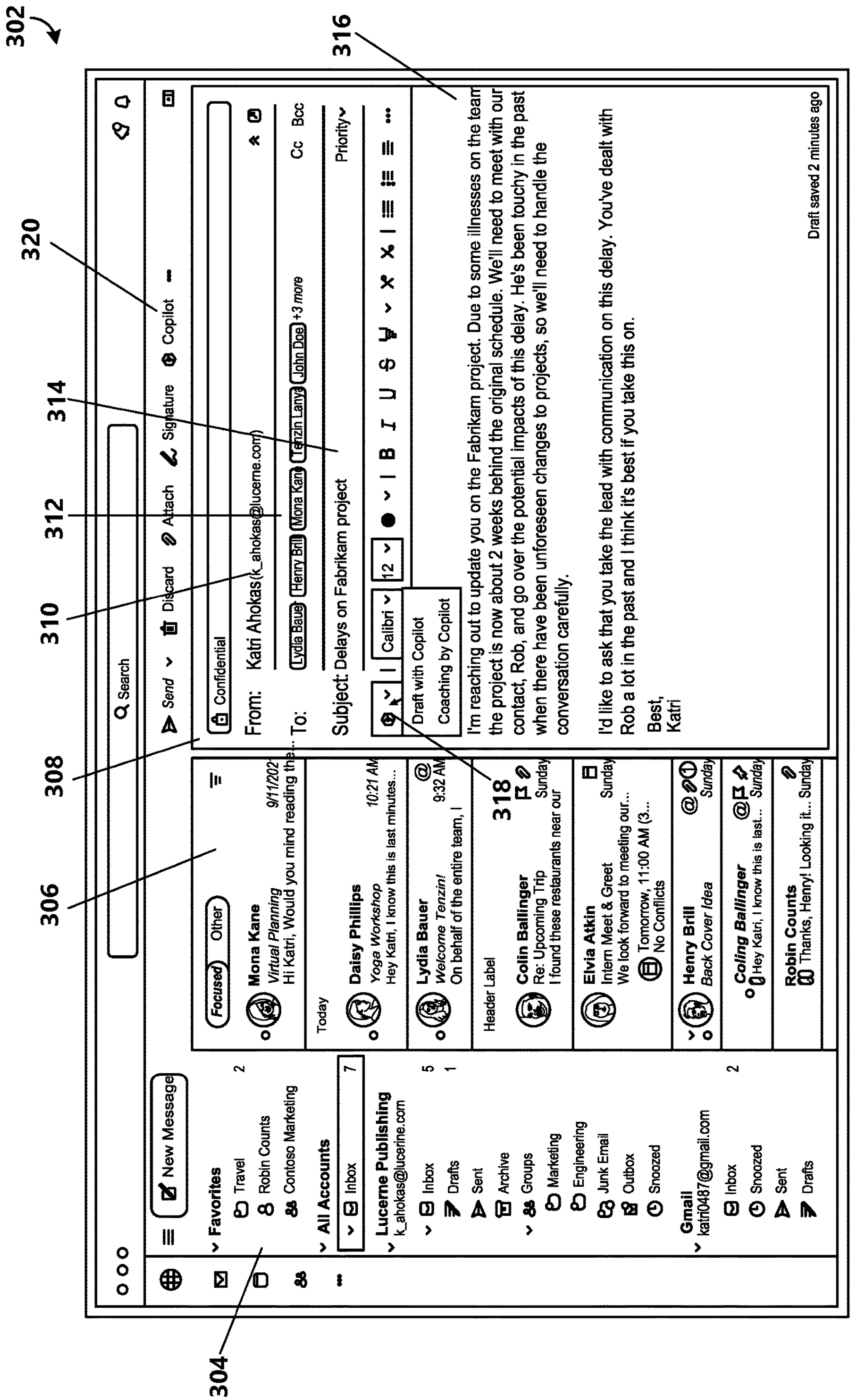
FIG. 3A depicts an example interface for generating advanced feedback for a message.

FIG. 3A depicts an example interface 302 for generating advanced feedback for a message. The interface 302 is of a message application, and the interface 302 may be referred to as a messaging-application interface 302. In particular, the example interface 302 is for an e-mail application. The interface 302 includes a folder panel 304 that lists a number of message folders, such as an inbox folder, sent messages folder, etc. A message preview panel 306 is included adjacent to the folder panel 304. The message preview panel 306 includes a list of messages that may be selected. The messages in the preview panel 306 may include a preview of information about each of the messages, such as the sender, subject, time sent, and a portion of the body of the message.

A message detail panel 308 is shown adjacent the preview panel. The detail panel 308 shows details of the draft message being drafted and allows the user to draft and/or edit the message. The detail panel 308 includes a from field 310 that lists the sender (e.g., the user to whom the interface 302 is displayed), and a to field 312 that lists the recipients of the draft message. The user may edit the recipients by adding or removing users from the to field 312. The detail panel 308 further includes a subject field 314 where the subject of the message may be edited. In addition, a body field 316 is also included in the detail panel where the body of the message may be edited.

The detail panel 308 may also include an AI user interface (UI) element 318 that may be selected to activate AI features of the technology discussed herein. For instance, in the example depicted, selection of the AI UI element 318 causes a drop-down menu to be displayed. The drop-down menu includes an option for AI-assisted drafting (e.g., "Draft with Copilot") and an option for advanced feedback features (e.g., "Coaching by Copilot"). In the example depicted, the AI UI element 318 is displayed with font and formatting options, which may be displayed between the subject field 314 and the body field 316.

In other examples, different or additional AI-activation elements 320 may be provided in the interface 302. For instance, an AI-activation element 320 may be provided in a menu bar for controls of the message. In other examples, the AI-activation element is included in the ribbon or main menu portions of the application interface 302.

When the advanced feedback features option is selected, the draft message is sent to the feedback generator 260 for advanced feedback on the draft message to be generated. For instance, the data in the to field, recipient field 312, subject field 314, and/or body field 316 of the draft message may be sent to the feedback generator 260 for inclusion in the AI prompts discussed herein.

Figure 3B:
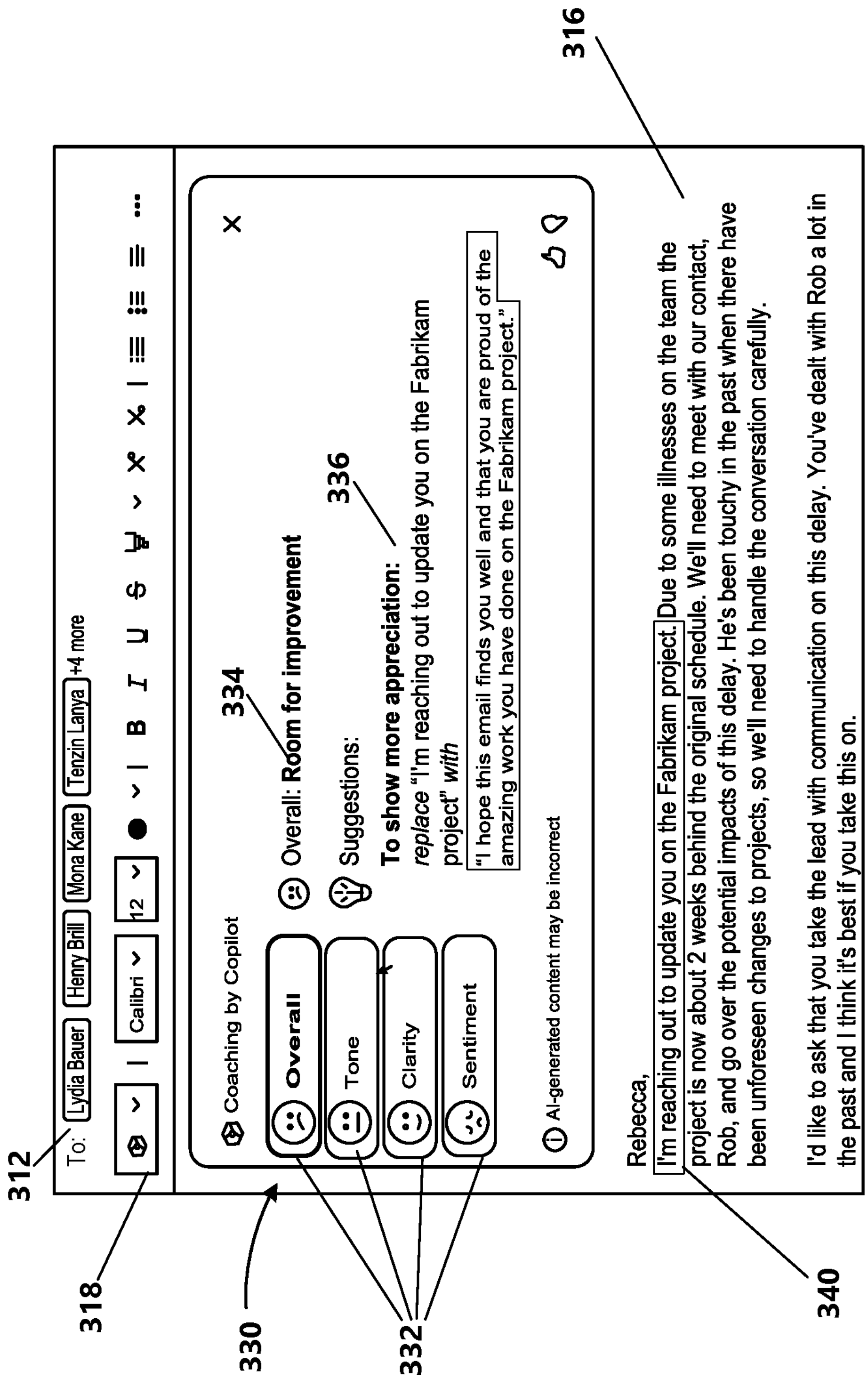
FIG. 3B depicts another example interface for generating advanced feedback for a message.

FIG. 3B depicts another example interface for generating advanced feedback for a message. In particular, FIG. 3B shows the message detail panel 308 after the feedback has been received from the feedback generator 260. In the example depicted, the feedback is shown in a feedback subpanel 330 of the message detail panel 308. The feedback subpanel 330 may be displayed adjacent to the body field 316, such as between the subject field 314 and the body field 316 and/or between the to field 312 and the body field 316. By positioning the feedback subpanel 330 adjacent the body field, the limited display area is optimally used such that data in the body field 312 and the feedback subpanel 330 may be concurrently viewed. Such an arrangement leads to improved interaction performance and reduced error rates in applying the advanced feedback set forth in the feedback subpanel.

The feedback subpanel 330 includes selectable topic options 332. The selectable topic options 332 correspond to the different topics set forth in the topic instructions of the AI prompt that was used to generate the feedback. When one of the selectable topic options 332 is selected, the advanced feedback for that topic is displayed in the feedback subpanel 330. The feedback subpanel 330 may include a concise feedback segment 334 and a suggested revision segment 336 that may be provided for each of the different topics in the topic options 332.

In FIG. 3B, the topic option 332 of Overall is selected. The concise feedback segment 334 indicates that there is room for improvement for the draft message. The revision segment 336 indicates a specific portion of the body to be replaced or changed. For instance, the revision segment 336 indicates the current portion of the body (e.g., sentence) and the new portion (e.g., sentence) that should replace the current portion. The current sentence 340 that is being suggested to be revised is also highlighted in the body field 316 so that it is easily identifiable. Highlighting of the current sentence 340 to be revised improves the efficiency for which the suggestion may be assessed, especially for long messages including large amounts of text. The highlighting further reduces the error rate of incorrect sentences being modified by the user rather than the current sentence 340 for which the revision is being suggested. The revision segment 336 also provides an explanation as to why the edits should be made (e.g., "to show more appreciation"). In some examples, the explanation further includes a particular user of a custom profile that is the cause or reason for the feedback. For instance, where a custom profile for User A is included in the AI prompt, the explanation may include a statement such as "User A reacts well when the message includes high amounts of appreciation. To show more appreciation:".

Figure 3C:
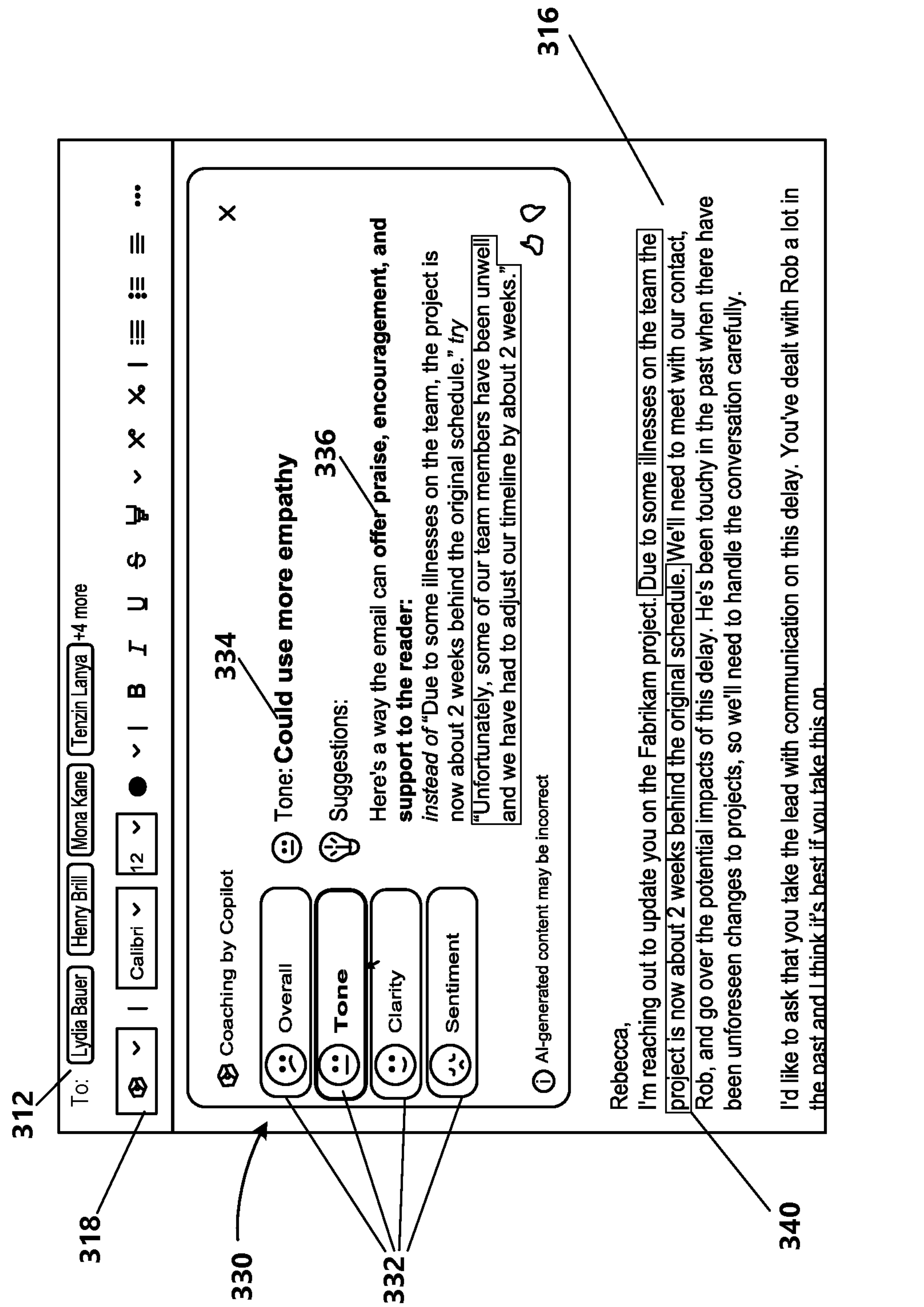
FIG. 3C depicts another example interface for generating advanced feedback for a message.

FIG. 3C depicts another example interface for generating advanced feedback for a message. In particular, FIG. 3C shows the feedback subpanel 330 with the topic option of Tone being selected. When the tone option is selected, the overall feedback segment 334 and the revision segment 336 are updated to provide feedback about the tone of the draft message. In the example depicted, the concise feedback segment 334 indicates that the tone could use more empathy. The revision segment 336 again indicates a current sentence and a sentence to replace the current sentence. In addition, the explanation is provided, which in this example is "Here's a way the email can offer praise, encouragement, and support to the reader."

Figure 3D:
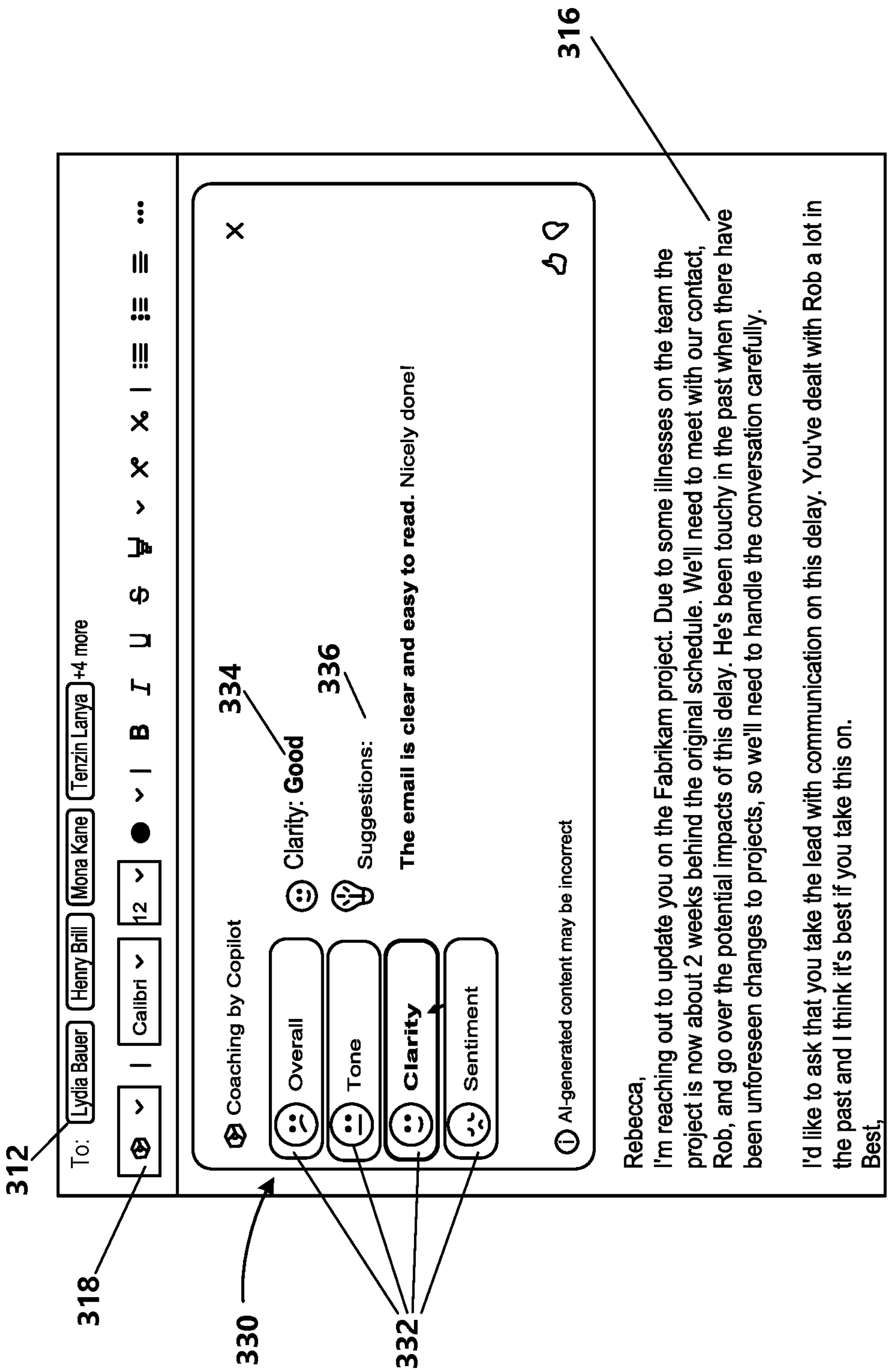
FIG. 3D depicts another example interface for generating advanced feedback for a message.

FIG. 3D depicts another example interface for generating advanced feedback for a message. In particular, FIG. 3D depicts the feedback subpanel 330 when the Clarity topic option 332 is selected. When the Clarity option is selected, the concise feedback segment 334 and the revision segment 336 are updated to provide feedback about the clarity of the message. In the example depicted, the clarity of the draft message is good, as indicated in the concise feedback segment 334. As a result, no suggested revisions are presented in the revision segment 336.

Figure 3E:
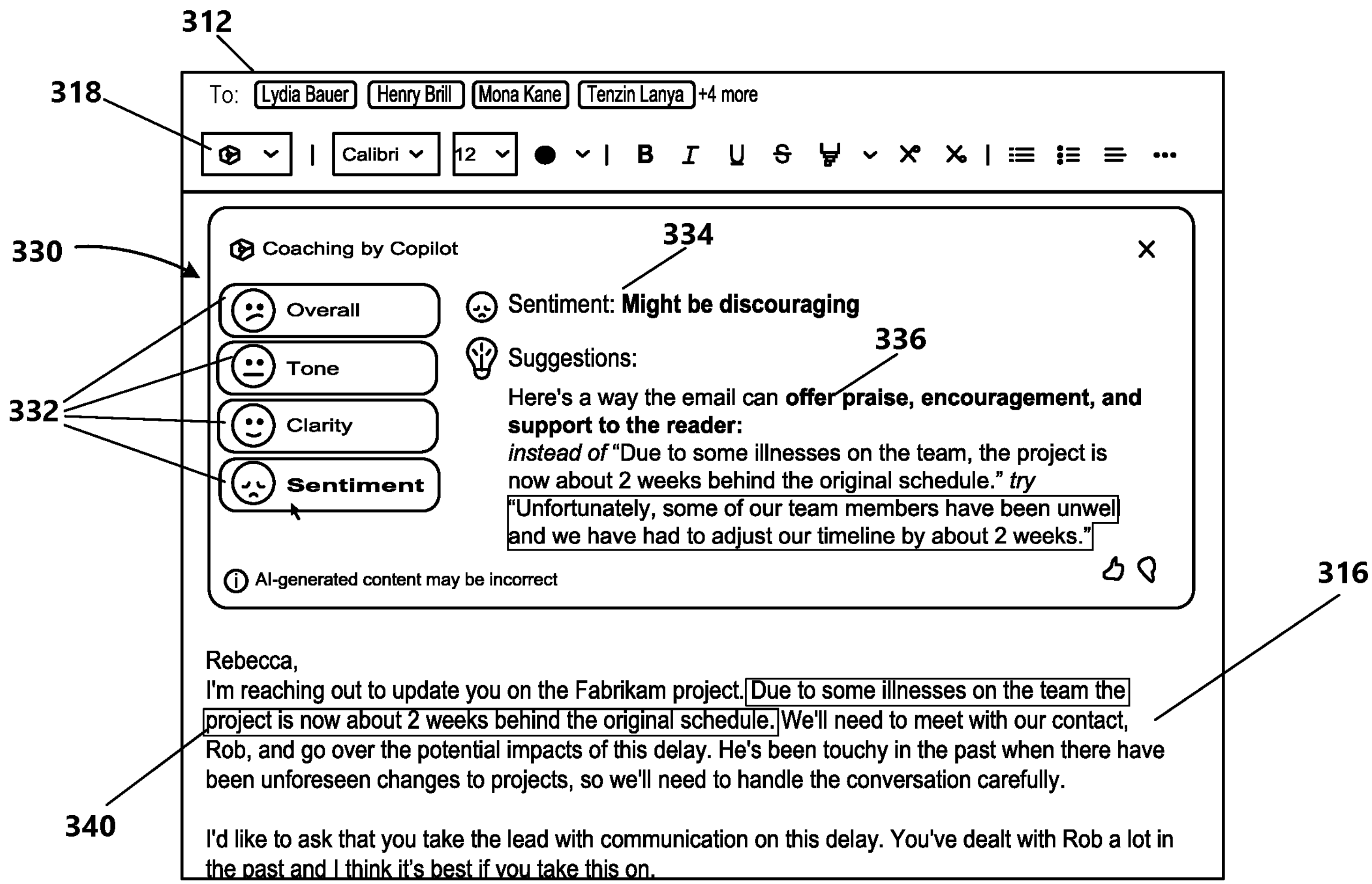
FIG. 3E depicts another example interface for generating advanced feedback for a message.

FIG. 3E depicts another example interface for generating advanced feedback for a message. In particular, FIG. 3 depicts the feedback subpanel 330 when the Sentiment topic option 332 is selected. When the Sentiment option is selected, the concise feedback segment 334 and the revision segment 336 are updated to display feedback about the sentiment of the message. In the example depicted, the concise feedback segment 334 indicates that the message "might be discouraging." The revision segment 336 again provides a current sentence of the message that can be replaced by a new sentence. The explanation provided is that the revision can offer praise, encouragement, and support to the reader.

Figure 4:
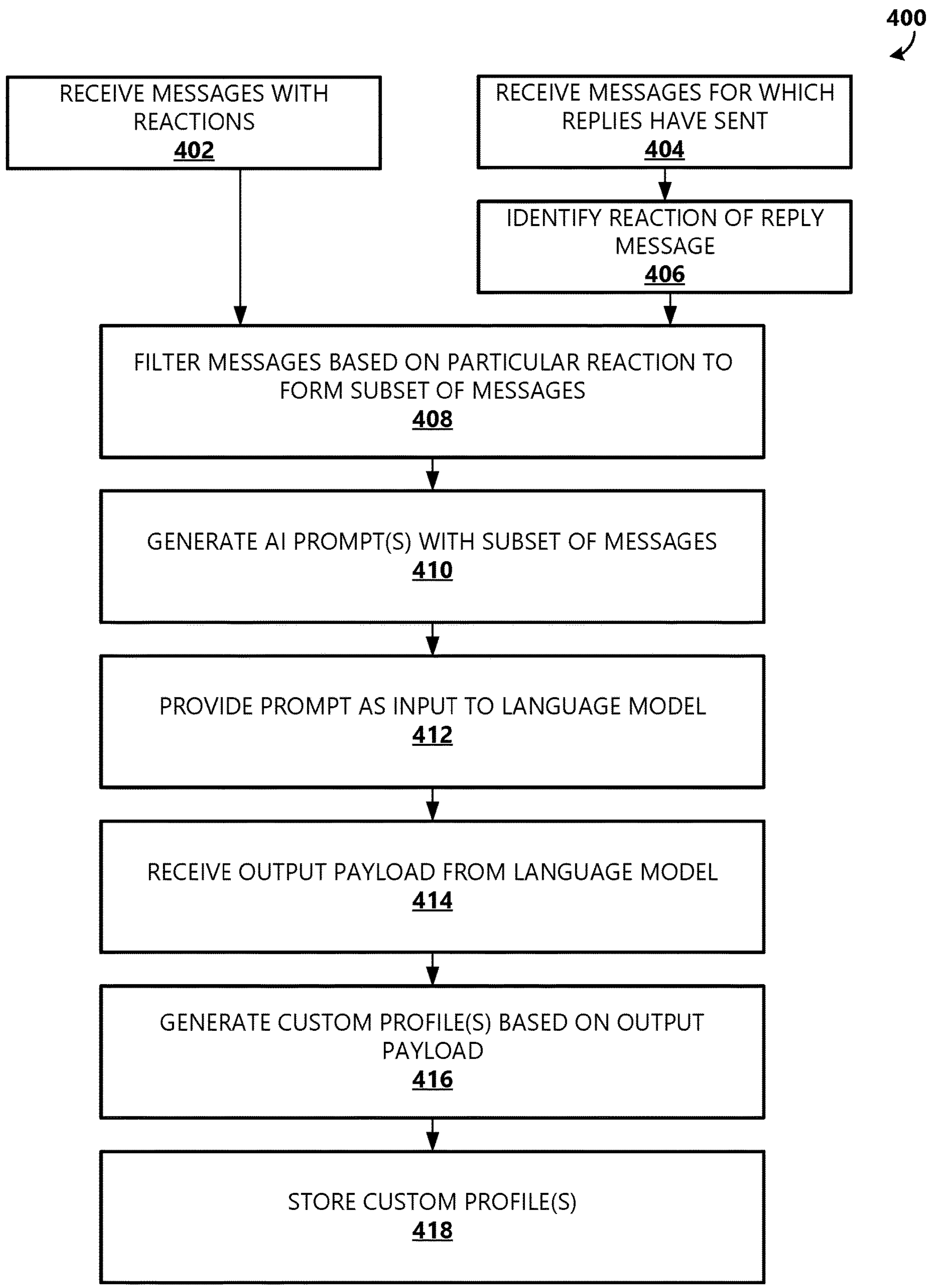
FIG. 4 depicts an example method of generating custom profiles from messages.

FIG. 4 depicts an example method 400 of generating custom profiles from messages. The operations of method 400 may be performed by one or more the devices of the systems discussed herein. For instance, a computing device (such as server or cloud computing device) may include at least one processor and memory storing instructions that, when executed by the at least one processor, cause the operations of method 400 to be performed. For example, a server in communication a messaging application may perform the operations of FIG. 4. The server may include the preference aggregator and its respective components, as discussed above.

At operation 402, message with reactions are received. For instance, messages for which a particular user has provided reactions may be identified. The reactions may be provided as a reaction-type communication and be associated with a particular message. The reactions may include thumbs up, heart, celebrate, laugh, surprise, and/or sad, among others.

At operation 404, messages are received for which replies have been sent by a particular user. For instance, messages for which the particular user sent a reply are received. At operation 406, the replies to the messages are analyzed to determine the reaction of the reply. For instance, the replies may be analyzed to determine if the reaction of the reply was positive or negative. For instance, the replies may be processed by a sentiment analysis AI model or service, such as the sentiment analysis tool of Azure Cognitive Services, to determine if the reply is indicative of a positive or negative reaction to the message. The message may then be tagged with the positive or negative reaction.

At operation 408, the received messages from operation 402 and/or operation 404 are filtered based on their corresponding reaction to form a subset of messages. For instance, the messages may be filtered to include all messages that include or are tagged with a positive reaction to form a subset of positive-reaction messages. Alternatively or additionally, the messages may be filtered to include all messages that include or are tagged with a negative reaction to form a subset of negative-reaction messages.

At operation 410, one or more AI prompts are generated for the subset of messages. For instance, a single AI prompt may be generated that includes multiple messages. In other examples, an AI prompt may be generated for each of the messages. In some instances, grouping of messages into a single AI prompt reduces the overall process power and resources consumed by the language model as compared to processing a separate AI prompt for each of the messages.

The generated AI prompt includes static segments and dynamic segments. The dynamic segments are populated with data from the messages in the subset. For instance, the dynamic segments are populated with the body of the draft message, and the dynamic segments may also be populated with the recipients of the draft message, the subject of the draft message, and/or other metadata of the draft message. The static portions may include request instructions that instruct the language model to detect primary topics of the messages, styles of the messages, mood or tone of the messages, and/or the user's response to the messages.

At operation 412, the generated AI prompt is provided as input to the language model. The language model processes the received AI prompt and generates as an output payload, as discussed herein. The output payload is received at operation 414.

At operation 416, a custom profile for the particular user is generated based on the output payload that is received from the language model. In some examples, custom profiles may be generated based for the other users for which the user interacted based on messages and/or reactions received from those other users. As an example, the custom profile for the user may include the primary topics for which the user provides a positive response or reaction. Alternatively or additionally, the custom profile for the user may include tones or styles of messages (e.g., formal, neutral, casual, short, medium, long).

At operation 418, the custom profile(s) are stored. In some examples, the custom profiles are stored in a remote database that is accessible to multiple devices. Accordingly, the custom profiles of multiple users may be accessed and used by a single user when drafting a message, as discussed further herein. In other examples, the custom profiles may be stored locally.

Figure 5:
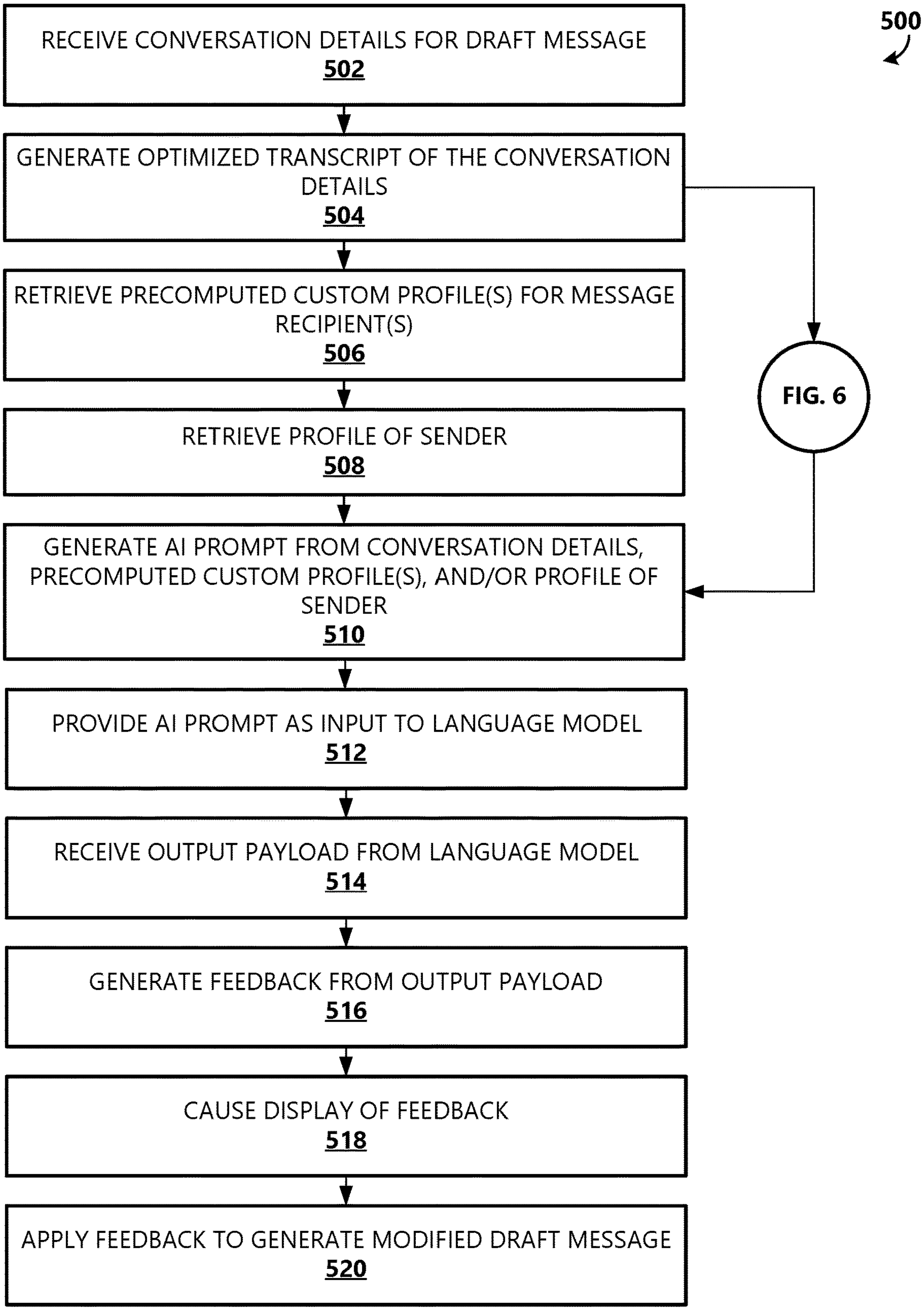
FIG. 5 depicts an example method of generating advanced feedback on messages.

FIG. 5 depicts an example method 500 of generating advanced feedback on messages. The operations of method 500 may be performed by one or more the devices of the systems discussed herein. For instance, a computing device (such as server or cloud computing device) may include at least one processor and memory storing instructions that, when executed by the at least one processor, cause the operations of method 500 to be performed. For example, a server in communication a messaging application may perform the operations of method 500. The server may include the feedback generator and its respective components, as discussed above. Operations of method 400 may also be performed by the messaging application itself as well.

At operation 502, conversation details for a draft message currently being composed by a user are received. The conversation details be received in response to a selection of an AI activation UI element. In other examples, the method 500 may be triggered automatically during composition of the draft message. The conversation details for the draft message include the body of the message being drafted and the recipients of the draft message. The conversation details may also include the subject of the draft message and/or other metadata for the message (e.g., confidentiality, tags, urgency). Where the draft message is a reply message, the conversation details may further include additional messages in the message thread for which the reply message is being drafted (e.g., the earlier messages in the thread).

At operation 504, an optimized transcript of the conversation details may be generated. The transcript is optimized for improved performance and processing of the data by the language model. For instance, in some examples, input prompts to the language model are limited in size. In other examples, latency can be impacted based on various attributes of the input prompt provided to the language model. By optimizing the prompt and/or the conversation details provided as input to the language model, the language model provides a more relevant response and/or utilizes fewer computing resources to generate the response.

According to examples, the language model is a language model trained on a vast corpus of text data. In some examples, the vast corpus of text data includes various languages. Accordingly, the language model is designed to understand and generate responses to words and phrases in various languages. In some examples, the training data on which the language model is trained is of a higher quality and quantity in a first language of a plurality of languages. Thus, the language model's ability to understand and generate responses in the first language may be greater than the model's ability to understand and generate responses in other languages corresponding to less and/or lower quality training data.

In further examples, the language model's performance further depends on the specific context in which the words or phrases are used in the prompt. For instance, the language model may use fewer tokens to process common words and phrases of the first language. Accordingly, optimizing the conversation details may include converting or otherwise formatting data into a human readable format in the first language and removing or translate words, phrases, and other data that are less familiar to the language model into more familiar text data.

According to examples, headers, signatures, repeated content, older messages, etc. may be removed from the conversation details to form the optimized transcript. Accordingly, in some examples signature content is removed from extracted messages included in a communication thread. In further examples, headers are removed from extracted messages included in a communication thread. In additional examples, repeated content is removed from extracted messages included in a communication thread. In yet additional examples, older messages are removed from an extracted communication thread that have a date/timestamp past a recency threshold. In further additional examples, the older messages are summarized and the summaries are included in the optimized transcript or prompt. As a result, the content of the older messages are still partially included in the prompt, but the contribution of the older messages to the prompt is shortened, which reduces prompt length and reduces latency.

Data of particular formats, such as machine-readable formats, may be identified and converted into a human-readable format. For instance, a date in the format of "Dec. 11, 2022" may be more ambiguous and, thus, require more processing by the language model to understand than the date in the format of "Dec. 11, 2022". Accordingly, dates may be converted into a human readable format or a long format. While such an expansion of the data introduces more text into the prompt, the overall processing resources consumed by the language model to process the long form of the date is actually less than required to process the short form of the date. As another example, time measurements in seconds are removed from timestamp data.

At operation 506, the precomputed custom profiles (e.g., the custom profiles generated from method 400) of the recipients of the draft message are retrieved. For instance, the database storing the custom profiles may be queried with the identifies of the recipients of the draft message.

At operation 508, a profile of the sender may also be retrieved. The profile of the sender may indicate additional preferences of the sender of the message. For instance, the profile of the sender may indicate a type of feedback preference that the sender prefers. As an example, the profile of the sender may indicate whether the sender prefers softened or more polite feedback or if the sender prefers more direct feedback. These preferences may be configured or edited by the user within the settings of the messaging application.

Figure 6:
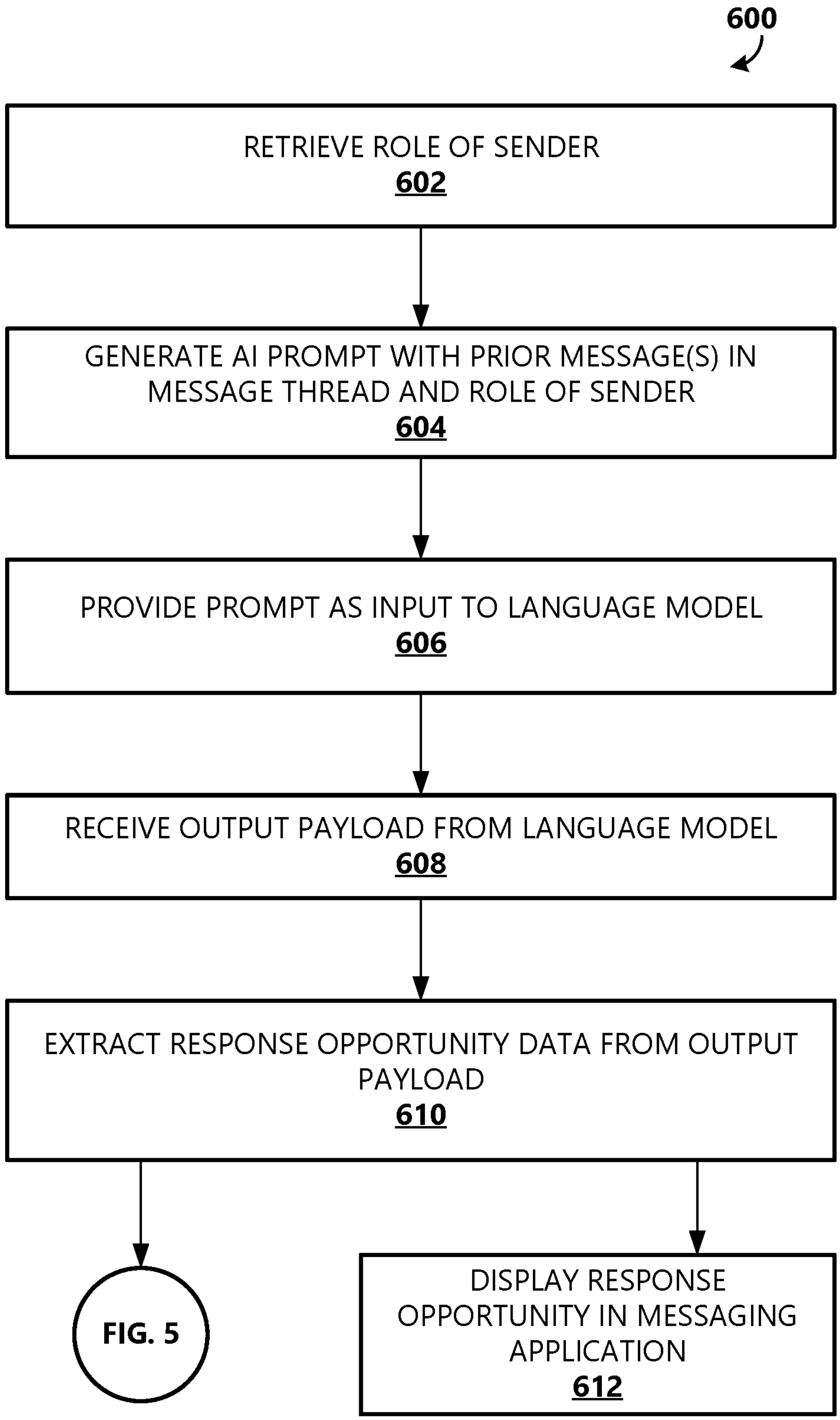
FIG. 6 depicts an example method for generating response opportunities for a message.

In some examples, the method 600 depicted in FIG. 6 may also be performed as part of method 500. In other examples, the operations of method 600 may be performed separately from the operations of the method 500. The method 600 may be performed where the message that is being drafted is a reply draft to one or more prior messages (e.g., a message in a message thread). The method 600 may be performed to identify unique opportunities and/or topics for which the sender is well-suited to respond.

At operation 602 of method 600, a role of the sender is retrieved. The role of sender may be retrieved from the profile of the sender that is accessed or retrieved in operation 508. The role of the sender may also be identified from an organization chart for the company where the sender is employed. In other examples, the role of the sender may be identified through a semantic analysis of the signature block of the sender. For instance, the role of the sender may be the title of the sender's position within a company. At operation 604, an AI prompt is generated that includes dynamic segments and static segments. The dynamic segments include the retrieved role of the sender as well as the content of the prior message(s) of the message thread. The static segments of the AI prompt include request instructions that instruct the language model to identify issues and/or questions from within the prior messages that are relevant to the user's role. The static segments may also include formatting instructions and output instructions for how the output payload from the language model should be formatted or structured.

At operation 606, the AI prompt generated in operation 604 is provided as input to the language model. The language model processes the received AI prompt and generates an output payload. The output payload is received in operation 608. At operation 610, one or more response opportunities are extracted from the received output payload. The response opportunity may be an identified topic, issue, and/or question from, or based on, the prior message(s) in the message thread. The extracted response opportunity may be displayed within the messaging application at operation 612. Alternatively or additionally, the extracted response opportunities are incorporated into another AI prompt in method 500 at operation 510.

Returning to method 500 depicted in FIG. 5, at operation 510 an AI prompt is generated from the conversation details received in operation 502 (and/or the optimized transcript generated in operation 504), the custom profile(s) received in operation 506, the profile of the sender received in operation 508, and/or the response opportunities extracted in operation 610. Each of these items may be incorporated into the prompt as dynamic segments. The AI prompt also includes additional static segments, such as the request instructions, output formatting instructions, and/or topic instructions, as discussed above.

At operation 512, the AI prompt generated in operation 510 is provided as input into the language model. The language model processes the received AI prompt as discussed herein. At operation 514, an output payload is received from the language model in response to the AI prompt.

At operation 516, the output payload is processed to generate the advanced feedback discussed herein. Processing the output payload may include filtering or cleaning the output payload to ensure inappropriate content was not provided by the language model 108. The processing also includes further formatting of the data in the output payload into the user interface features of the feedback, as discussed above. For instance, the output payload may be parsed to extract the different elements of the feedback to populate the user interface elements of the messaging application.

At operation 518, a display of the advanced feedback is caused by providing the feedback through the messaging application. The advanced feedback may be displayed in multitude of manners, such as through the UI elements discussed above. In some examples, the feedback may be automatically applied to the draft message to generate a modified draft message. For example, as discussed above, the advanced feedback may include recommendations for replacing or changing sentences or other portions of the body of the draft message. An additional option may be displayed with the advanced feedback that, when selected, causes the sentences or identified portions of the body of the draft message to be updated or replaced according to the advanced feedback at operation 520. The changes may be applied separately or selectively for each of the topic options of the advanced feedback.

FIG. 7 is a block diagram illustrating physical components (e.g., hardware) of a computing device 700 with which examples of the present disclosure may be practiced. The computing device components described below may be suitable for one or more of the components of the systems described above. In a basic configuration, the computing device 700 includes at least one processing unit 702 and a system memory 704. Depending on the configuration and type of computing device 700, the system memory 704 may comprise volatile storage (e.g., random access memory), non-volatile storage (e.g., read-only memory), flash memory, or any combination of such memories. The system memory 704 may include an operating system 705 and one or more program modules 706 suitable for running software applications 750 (e.g., one or more messaging applications 112, preference aggregators 202, and/or feedback generators) and other applications.

The operating system 705 may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including one or more of the stages of the methods 400, 500, and 600, illustrated in FIG. 4-6. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 700 on the single integrated circuit (chip). Examples of the present disclosure may also be practiced using other technologies capable of performing logical operations such as, for example, AND, OR, and NOT, including mechanical, optical, fluidic, and quantum technologies.

The computing device 700 may also have one or more input device(s) 712 such as a keyboard, a mouse, a pen, a sound input device, a touch input device, a camera, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 704, the removable storage device 709, and the non-removable storage device 710 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer readable media may be part of the computing device 700. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a system for generating advanced feedback for a draft message using a language model. The system includes at least one processor; and memory storing instructions that, when executed by the at least one processor, cause the system to perform operations. The operations include: receive conversation details for a draft message while the draft message is being composed within a user interface of a messaging application; retrieve a precomputed custom profile for a recipient of the draft message, wherein the precomputed custom profile for the recipient includes a preference of the recipient based on prior messages to which the recipient has replied or reacted; generate an artificial intelligence (AI) prompt, for a language model, including dynamic segments and static segments, wherein the dynamic segments are populated with the conversation details of the draft message and at least a portion of the retrieved precomputed profile and the static segments include request instructions; provide the AI prompt as input to the language model; in response to the AI prompt, receive an output payload from the language model; post-process the received output payload to extract advanced feedback for the draft message; and cause a display of the extracted advanced feedback within the user interface of the messaging application.

In an example, the operations further include generating an optimized transcript of the conversation details, wherein generating the optimized transcript includes at least one of translating one or more words of the conversation details to another language; transforming a date representation to natural language format; removing a header; removing a signature; removing a message in the conversation details that was sent after a recency threshold; or summarizing the message in the conversation details that was sent after a recency threshold; and wherein optimized transcript is incorporated into the AI prompt. In another example, the static segments further include output formatting instructions that indicate how the output payload is to be formatted and structured. In still another example, the AI prompt is a first AI prompt, the output payload is a first output payload, and the operations further include: retrieving a role of a sender of the draft message; generate a second AI prompt including the conversation details and the retrieved role of the sender; provide the second AI prompt as input to the language model; in response to the second AI prompt, receive a second output payload from the language model; and extract a response opportunity from the second output payload, wherein the response opportunity indicates a topic or issue within the conversation details suited for the role of the sender. In a further example, the response opportunity is incorporated into the first AI prompt.

In another example, the message includes multiple recipients including the recipient, and precomputed custom profiles are retrieved for a subset of the multiple recipients based on at least one of a role or title of each of the multiple recipients. In still another example, the static segments of the AI prompt further include topic instructions with topics for which the advanced feedback is to be provided. In a further example, causing the display of the advanced feedback includes causing the display of a feedback subpanel that comprises topic options corresponding to the topics in the topic instructions. In yet another example, the feedback subpanel further comprises a concise feedback segment and a revision segment, wherein the revision segment indicates a portion of the draft message to be replaced. In still yet another example, the user interface of the messaging application includes a to field and a body field, and wherein the feedback subpanel is positioned between the to field and the body field.

In another aspect, the technology relates to a system for generating advanced feedback for a draft message using a language model. The system includes at least one processor; and memory storing instructions that, when executed by the at least one processor, cause the system to perform operations. The operations include receive messages for which at least one of reactions or replies have been sent by a user; filter the received messages based on a reaction type to form a subset of messages; generate an AI prompt, for a language model, including dynamic segments and static segments, the dynamic segments populated with the subset of messages and the static segments including request instructions to detect at least one of primary topics of the messages, styles of the messages, or tone of the messages; provide the AI prompt as input to the language model; in response to the AI prompt, receive an output payload from the language model; based on the output payload, generating a custom profile for the user; and storing the custom profile in a database accessible by messaging applications of multiple users.

In an example, the operations further comprise performing a semantic analysis on the replies to identify reactions of the replies. In another example, the user is a first user, the AI prompt is a first AI prompt, the output payload is a first output payload, and the operations further include: receive conversation details for a draft message while the draft message is being composed within a user interface of a messaging application, wherein a sender of the draft message is a second user and a recipient of the draft message is the first user; retrieve the custom profile, for the first user, from the database; generate a second AI prompt, for the language model, including dynamic segments and static segments, wherein the dynamic segments are populated with the conversation details of the draft message and portions of the retrieved custom profile and the static segments include request instructions; provide the second AI prompt as input to the language model; in response to the second AI prompt, receive a second output payload from the language model; post-process the received second output payload to extract advanced feedback for the draft message; and cause a display of the extracted advanced feedback within the user interface of the messaging application. In still another example, the static segments of the second AI prompt further include topic instructions with topics for which the advanced feedback is to be provided. In a further example, causing the display of the advanced feedback includes causing the display of a feedback subpanel that comprises topic options corresponding to the topics in the topic instructions. In still yet another example, the feedback subpanel further comprises a concise feedback segment and a revision segment, wherein the revision segment indicates a portion of the draft message to be replaced.

In another aspect, the technology relates to a computer-implemented method for generating advanced feedback for a draft message using a language model. The method includes receiving conversation details for a draft message while the draft message is being composed within a user interface of a messaging application, wherein the user interface includes a to field, a sender field, a subject field, and a body field; retrieving a precomputed custom profile for a recipient of the draft message, wherein the precomputed custom profile for the recipient includes a preference of the recipient based on prior messages to which the recipient has replied or reacted; generating an AI prompt, for a language model, including dynamic segments and static segments, wherein the dynamic segments are populated with data in the body field of the draft message and the retrieved precomputed profile and the static segments include request instructions; providing the AI prompt as input to the language model; in response to the AI prompt, receiving an output payload from the language model; post-processing the received output payload to extract advanced feedback for the draft message; and causing a display of the extracted advanced feedback within a feedback subpanel of the user interface of the messaging application.

In an example, the feedback subpanel is displayed concurrently with at least the body field. In another example, the feedback subpanel comprises selectable topic options. In a further example, selection of one of the selectable topic options causes display of concise feedback segment and a revision segment for the topic of the selected topic option.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for generating advanced feedback for a draft message using a language model, comprising:

at least one processor; and memory storing instructions that, when executed by the at least one processor, cause the system to perform operations comprising:

receive conversation details for a draft message while the draft message is being composed within a user interface of a messaging application;

retrieve a precomputed custom profile for a recipient of the draft message, wherein the precomputed custom profile for the recipient includes a preference of the recipient based on prior messages to which the recipient has replied or reacted;

generate a first artificial intelligence (AI) prompt, for a language model, including dynamic segments and static segments, wherein the dynamic segments are populated with the conversation details of the draft message and at least a portion of the retrieved precomputed profile and the static segments include request instructions;

provide the first AI prompt as input to the language model;

in response to the first AI prompt, receive an output payload from the language model;

post-process the received output payload to extract advanced feedback for the draft message;

cause a display of the extracted advanced feedback within the user interface of the messaging application;

retrieve a role of a sender of the draft message;

generate a second AI prompt including the conversation details and the retrieved role of the sender;

provide the second AI prompt as input to the language model;

in response to the second AI prompt, receive a second output payload from the language model; and extract a response opportunity from the second output payload, wherein the response opportunity indicates a topic or issue within the conversation details suited for the role of the sender.

2. The system of claim 1, wherein the operations further comprise:

generating an optimized transcript of the conversation details, wherein generating the optimized transcript includes at least one of translating one or more words of the conversation details to another language; transforming a date representation to natural language format; removing a header; removing a signature; removing a message in the conversation details that was sent after a recency threshold; or summarizing the message in the conversation details that was sent after a recency threshold; and wherein optimized transcript is incorporated into the first AI prompt.

3. The system of claim 1, wherein the static segments further include output formatting instructions that indicate how the output payload is to be formatted and structured.

4. The system of claim 1, wherein the response opportunity is incorporated into the first AI prompt.

5. The system of claim 1, wherein the message includes multiple recipients including the recipient, and precomputed custom profiles are retrieved for a subset of the multiple recipients based on at least one of a role or title of each of the multiple recipients.

6. The system of claim 1, wherein the static segments of the first AI prompt further include topic instructions with topics for which the advanced feedback is to be provided.

7. The system of claim 6, wherein causing the display of the advanced feedback includes causing the display of a feedback subpanel that comprises topic options corresponding to the topics in the topic instructions.

8. The system of claim 7, wherein the feedback subpanel further comprises a concise feedback segment and a revision segment, wherein the revision segment indicates a portion of the draft message to be replaced.

9. The system of claim 7, wherein the user interface of the messaging application includes a to field and a body field, and wherein the feedback subpanel is positioned between the to field and the body field.

10. A system for generating advanced feedback for a draft message using a language model, comprising:

at least one processor; and memory storing instructions that, when executed by the at least one processor, cause the system to perform operations comprising:

receive messages for which at least one of reactions or replies have been sent by a user;

filter the received messages based on a reaction type to form a subset of messages;

generate an AI prompt, for a language model, including dynamic segments and static segments, the dynamic segments populated with the subset of messages and the static segments including request instructions to detect at least one of primary topics of the messages, styles of the messages, or tone of the messages;

provide the AI prompt as input to the language model;

in response to the AI prompt, receive an output payload from the language model;

based on the output payload, generate a custom profile for the user; and store the custom profile in a database accessible by messaging applications of multiple users.

11. The system of claim 10, wherein the operations further comprise performing a semantic analysis on the replies to identify reactions of the replies.

12. The system of claim 10, wherein the user is a first user, the AI prompt is a first AI prompt, the output payload is a first output payload, and the operations further comprise:

receive conversation details for a draft message while the draft message is being composed within a user interface of a messaging application, wherein a sender of the draft message is a second user and a recipient of the draft message is the first user;

retrieve the custom profile, for the first user, from the database;

generate a second AI prompt, for the language model, including dynamic segments and static segments, wherein the dynamic segments are populated with the conversation details of the draft message and portions of the retrieved custom profile and the static segments include request instructions;

provide the second AI prompt as input to the language model;

in response to the second AI prompt, receive a second output payload from the language model;

post-process the received second output payload to extract advanced feedback for the draft message; and cause a display of the extracted advanced feedback within the user interface of the messaging application.

13. The system of claim 10, wherein the static segments of the second AI prompt further include topic instructions with topics for which the advanced feedback is to be provided.

14. The system of claim 13, wherein causing the display of the advanced feedback includes causing the display of a feedback subpanel that comprises topic options corresponding to the topics in the topic instructions.

15. The system of claim 14, wherein the feedback subpanel further comprises a concise feedback segment and a revision segment, wherein the revision segment indicates a portion of the draft message to be replaced.

16. A computer-implemented method for generating advanced feedback for a draft message using a language model, comprising:

receiving conversation details for a draft message while the draft message is being composed within a user interface of a messaging application, wherein the user interface includes a to field, a sender field, a subject field, and a body field;

retrieving a precomputed custom profile for a recipient of the draft message, wherein the precomputed custom profile for the recipient includes a preference of the recipient based on prior messages to which the recipient has replied or reacted;

generating a first AI prompt, for a language model, including dynamic segments and static segments, wherein the dynamic segments are populated with data in the body field of the draft message and the retrieved precomputed profile and the static segments include request instructions;

providing the first AI prompt as input to the language model;

in response to the first AI prompt, receiving an output payload from the language model;

post-processing the received output payload to extract advanced feedback for the draft message;

causing a display of the extracted advanced feedback within a feedback subpanel of the user interface of the messaging application;

retrieving a role of a sender of the draft message;

generating a second AI prompt including the conversation details and the retrieved role of the sender;

providing the second AI prompt as input to the language model;

in response to the second AI prompt, receiving a second output payload from the language model; and extracting a response opportunity from the second output payload, wherein the response opportunity indicates a topic or issue within the conversation details suited for the role of the sender.

17. The computer-implemented method of claim 16, wherein the feedback subpanel is displayed concurrently with at least the body field.

18. The computer-implemented method of claim 16, wherein the feedback subpanel comprises selectable topic options.

19. The computer-implemented method of claim 18, wherein selection of one of the selectable topic options causes display of a concise feedback segment and a revision segment for the topic of the selected topic option.

* * * * *